United States Patent

Wu et al.

[11] Patent Number: 6,076,964
[45] Date of Patent: Jun. 20, 2000

[54] PREDICTION OF INTERNAL TEMPERATURE OF A BATTERY USING A NON-LINEAR DYNAMIC MODEL

[75] Inventors: Zhijian James Wu; Gang Chen, both of Rochester Hills; Anson Lee, St. Clair; Kerry D. Franks, Chelsea; Timothy L. McDonald, Novi; James R. Tamm, Ann Arbor, all of Mich.

[73] Assignee: Chrysler Corporation, Auburn Hills, Mich.

[21] Appl. No.: 09/189,552

[22] Filed: Nov. 11, 1998

[51] Int. Cl.⁷ .............................. G01K 1/12; G01K 1/16; G01K 1/20; G01K 15/00
[52] U.S. Cl. ......................... 374/141; 374/134; 374/152; 702/130; 429/90
[58] Field of Search ..................................... 374/141, 134, 374/152; 702/130, 132, 133, 134, 135, 136, FOR 142, FOR 150, 63, 181–184, 142, 145–148; 429/90

[56] References Cited

U.S. PATENT DOCUMENTS

| | | |
|---|---|---|
| 4,659,977 | 4/1987 | Kissel et al. ............................ 320/150 |
| 5,079,716 | 1/1992 | Lenhardt et al. ....................... 320/153 |
| 5,235,946 | 8/1993 | Fodale et al. ........................... 477/109 |
| 5,544,640 | 8/1996 | Thomas et al. ......................... 123/689 |
| 5,547,036 | 8/1996 | Gawaskar et al. ..................... 180/68.5 |
| 5,568,052 | 10/1996 | Sway-Tin et al. ...................... 324/435 |
| 5,645,745 | 7/1997 | Hartwick et al. ...................... 219/497 |
| 5,646,534 | 7/1997 | Kopera ................................... 324/434 |
| 5,711,605 | 1/1998 | Reher et al. ............................ 374/141 |
| 5,803,608 | 9/1998 | Randoll et al. ........................ 374/134 |
| 5,808,469 | 9/1998 | Kopera ................................... 324/434 |
| 6,006,168 | 12/1999 | Schumann et al. .................... 374/134 |

FOREIGN PATENT DOCUMENTS 2151862  7/1995  United Kingdom .................. 374/134

*Primary Examiner*—Diego Gutierrez
*Assistant Examiner*—Stanley J. Pruchnic, Jr.
*Attorney, Agent, or Firm*—Mark P. Calcaterra

[57] ABSTRACT

A method of determining a vehicle battery temperature by a non-linear dynamic model based on the physical concepts of thermal transfer and a system identification technique. The battery temperature model uses several available physical measurements from the vehicle, including the engine coolant temperature, surrounding air temperature, vehicle speed and the engine fan on/off state. This method also includes the estimation of an initial value of battery temperature before starting the iteration process by the battery temperature prediction from the dynamic model.

27 Claims, 2 Drawing Sheets

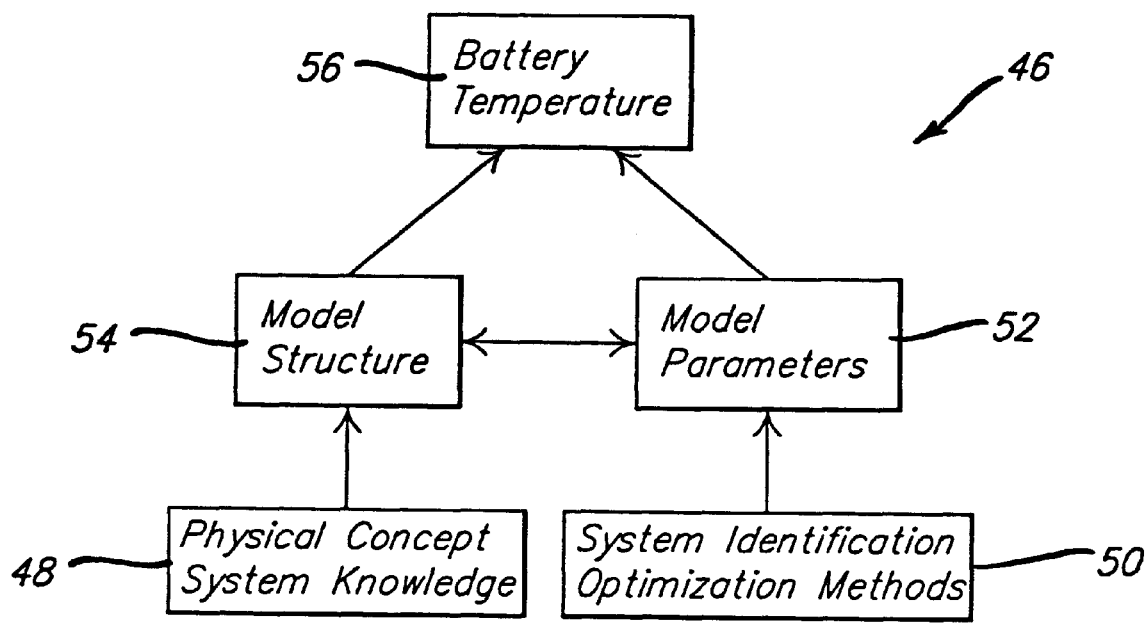

PREDICTION OF INTERNAL TEMPERATURE OF A BATTERY USING A NON-LINEAR DYNAMIC MODEL

BACKGROUND OF THE INVENTION

1. Field of the Invention

This invention relates generally to a method of determining the internal temperature of a battery and, more particularly, to a method of determining the internal temperature of a vehicle battery using a non-linear dynamic model.

2. Discussion of the Related Art

A typical internal combustion engine of a vehicle includes a battery, usually a 12-volt DC battery, that provides power to operate the various vehicle electrical systems. When the battery is providing power to one or more of the vehicle electrical systems, the power drain on the battery reduces the battery charge, and thus its voltage output. When the vehicle is running, a vehicle alternator recharges the battery so that the battery charge is high enough for continued power output to the vehicle electrical systems. The greater the power drain on the battery, the more charging voltage needs to be applied to the battery from the alternator. To control the charging output of the alternator, a field control input signal from a controller sets the duty cycle of the alternator depending on the drain on the vehicle battery. This field control of the alternator is referred to as the electronic voltage regulator (EVR) set point of a vehicle battery charging system.

Modern vehicles include an engine control module that provides vehicle system output control signals based on various inputs from the operation of the vehicle. Such an engine control module 10 is depicted in FIG. 1 and includes a central processing unit (CPU) 12. The CPU 12 receives various input signals, including engine speed, coolant temperature, manifold pressure, throttle position, etc., and outputs various output signals to control the operation of the vehicle, including fuel injector, ignition coil, idle speed motor, fan relay, etc., as is well understood in the art. One of those outputs is an alternator control output that provides the EVR set point.

Battery temperature is an important parameter for providing battery charging control. The temperature of the vehicle battery is required to determine an accurate EVR set point for proper battery charging. A proper set point for the desired battery target voltage will prevent the battery from overheating at high battery temperatures during charging, and prevent the battery from being undercharged at low battery temperatures during charging. For current vehicle technology, a battery temperature sensor, such as a negative temperature coefficient sensor, is mounted outside of the vehicle battery, usually under the battery tray that the battery is mounted on. Because the sensor is mounted outside of the battery, the temperature measurement is severely affected by the surrounding environment, and therefore does not reflect the dynamic variations of the battery's internal temperature very well. The battery temperature sensor thus, generally gives a poor temperature measurement performance. The inability to accurately measure a vehicle battery's temperature adversely affects the recharging of the battery. Errors between the real battery temperature measured with a temperature sensor inside the battery, and the temperature measured with a temperature sensor outside of the battery have been shown to be as high as 40° F.

It is impractical to incorporate a temperature sensor within the vehicle battery itself because of the costs involved, the design requirements of the battery, and the fact that the battery is often replaced by the user. Additionally, not only does the temperature sensor mounted outside of the battery not provide an accurate temperature measurement of the internal temperature of the battery, it also adds cost for the sensor A/D device and installation labor to the vehicle. Therefore, it would be beneficial to eliminate the temperature sensor outside of the battery, and provide a more reliable and cost effective technique for determining battery temperature.

It is therefore an object of the present invention to provide such a technique of predicting the internal temperature of a battery.

SUMMARY OF THE INVENTION

In accordance with the teachings of the present invention, a technique is disclosed for determining the internal temperature of a vehicle battery without using a dedicated battery temperature sensor. By this technique, a non-linear battery temperature dynamic model is developed based on the physical concepts of thermal transfer and system identification technology. The battery temperature model uses several available physical measurements from the vehicle, including the engine coolant temperature, surrounding air temperature, vehicle speed, and the engine fan on/off state. To start the iteration computation of the battery temperature value with the dynamic model, an estimation of the initial battery temperature value is required. The large heat capacity of a vehicle battery results in a large time constant for the battery temperature prediction model.

Additional objects, advantages and features of the present invention will become apparent from the following description and appended claims, taken in conjunction with the accompanying drawings.

BRIEF DESCRIPTION OF THE DRAWINGS

FIG. 3 is a block diagram depicting the procedure of determining the model structure and the parameters for the model shown in FIG. 2; and FIG. 4 depicts differential equation models for the coolant temperature, air temperature and battery temperature, respectively, to determine the initial battery temperature value for the model depicted in FIG. 2.

DETAILED DESCRIPTION OF THE PREFERRED EMBODIMENTS

The following discussion of the preferred embodiments directed to a technique for predicting the internal temperature of a battery using a non-linear dynamic model is merely exemplary in nature, and is in no way intended to limit the invention or its applications or uses. For example, the following discussion concerns determining the internal temperature of a battery associated with a vehicle. However, the technique of the invention has wider applications for determining the internal battery temperature of batteries associated with other systems.

Figure 1:
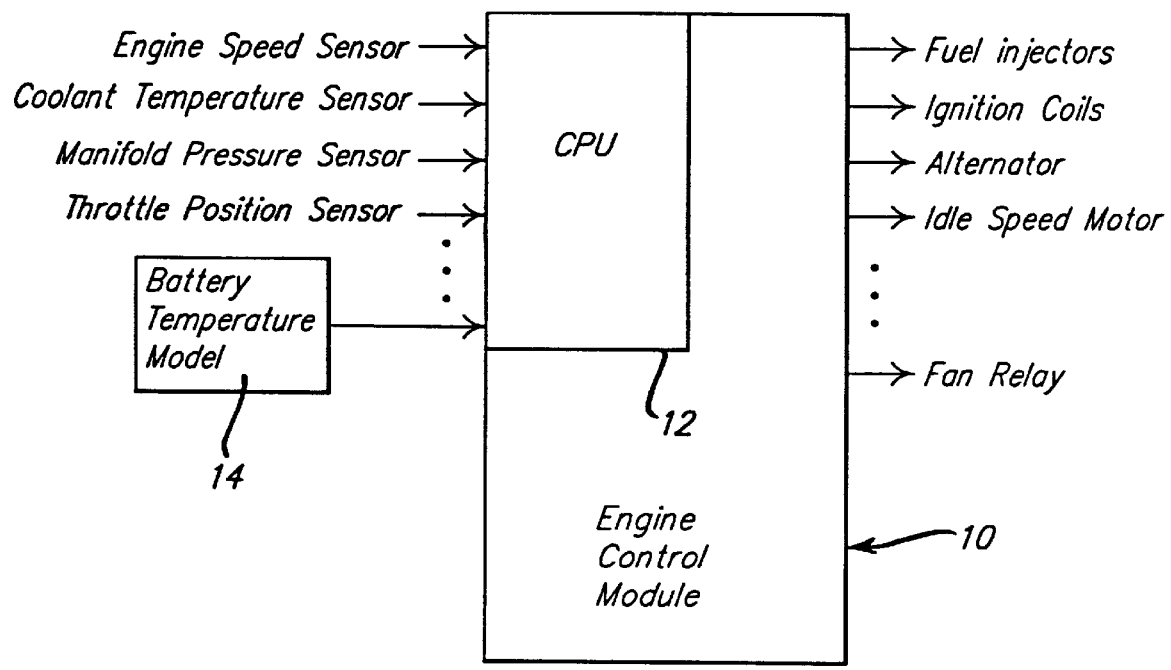
FIG. 1 is a block diagram of an engine control module associated with a vehicle, including a battery temperature model implemented in the module, according to an embodiment of the present invention.

In accordance with the teaching of the present invention, a dynamic battery temperature model is developed based on the concept of heat transfer. The battery temperature model is represented at 14 in FIG. 1, and provides a predicted battery temperature to the engine control module 10. The output from the battery temperature model 14 is used to determine the alternator EVR set point output. When the heat generated from the chemical reaction inside of a battery is neglected, the change of the battery's internal temperature is mainly caused by the convection, conduction and radiation of the heat from sources surrounding the battery and from the battery itself. The temperature model of the invention uses these thermal transfer mechanisms from the heat sources to determine the temperature of the battery.

Heat conduction is defined as the instantaneous rate of heat flow $dQ/d\Theta$ as being equal to the product of three factors, the area A of the section taken at right angles to the direction of heat flow, the temperature gradient $-dt/dx$, which is the rate of change of the temperature t with respect to the length of path x, and the thermal conductivity k, which is a physical property of the material. This is mathematically expressed by Fourier's Law as:

$$\frac{dQ}{d\theta} = -kA\frac{dt}{dx} \quad (1)$$

For convection, the heat-transfer rate $q_c$ from a surface of a solid to a fluid is given by the equation:

$$q_c = h_m A(t_w - t) \quad (2)$$

where $h_m$ is the coefficient of heat transfer from the surface to fluid, excluding any radiation, A is the area of the surface, $t_w$ is the surface temperature, and t is the bulk temperature of the fluid.

The thermal radiation from an ideal black body radiator is given as:

$$dq_r = \sigma dA T^4 \quad (3)$$

where $dq_r$ is the rate of heat transfer by radiation from one side of a body having area dA, T is the absolute temperature of the surface, and $\sigma$ is the Stefan-Boltzmann dimensional constant, the magnitude of which depends only upon the units employed.

These theoretical models of heat convection, conduction and radiation can be used to define a temperature model for the battery temperature of a battery vehicle. For a vehicle, the main heat source is from the engine block, and is usually measured through the engine coolant. The heat transfer processes of conduction, convection and radiation of heat varies with surrounding physical conditions, such as wind speed. The wind speed is generated from the movement of the vehicle itself, from the engine cooling fan and from natural wind. Based on this assumption and the theoretical models of heat transfer, a battery temperature model, according to the invention, is defined as follows:

$$\frac{dT_b}{dt} = f_{bc}(V_w)(T_b - T_a) + f_{cc}(V_w)(T_c - T_a) + f_{cr}(V_w)T_{ck}^4 + f_{br}(V_w)T_{bk}^4 \quad (4)$$

where $T_b$ represents the temperature of the battery, $T_c$ represents the temperature of the engine coolant, $T_a$ represents the temperature of the surrounding air (ambient), $T_{ck}$ and $T_{bk}$ are the absolute temperatures corresponding to $T_c$ and $T_b$, respectively, $f_{bc}(V_w)$ and $f_{cc}(V_w)$ represent two coefficient functions of heat conduction and heat convection, $f_{cr}(V_w)$ represents a coefficient function of heat radiation from the engine block, $f_{br}(V_w)$ represents a coefficient function of the heat radiation from the battery itself, $V_w$ is the wind speed, and t denotes time.

In modern vehicles, temperature sensors are already provided that measure the ambient temperature $T_a$ and the coolant temperature $T_c$. In real applications, the wind speed $V_w$ is expressed as a function of the vehicle speed $V_s$, the natural wind speed $V_n$ and the engine coolant fan on/off state $V_f$. The vehicle speed $V_s$ and the coolant fan on/off state $V_f$ are readily available values from the engine control module 10. The natural wind speed $V_n$ is generally not available, thus an empirical formula to determine the wind speed $V_n$ can be given as a function of the coolant temperature $T_c$ and the vehicle speed $V_s$:

$$V_n = f(T_c, V_s) \quad (5)$$

Figure 2:
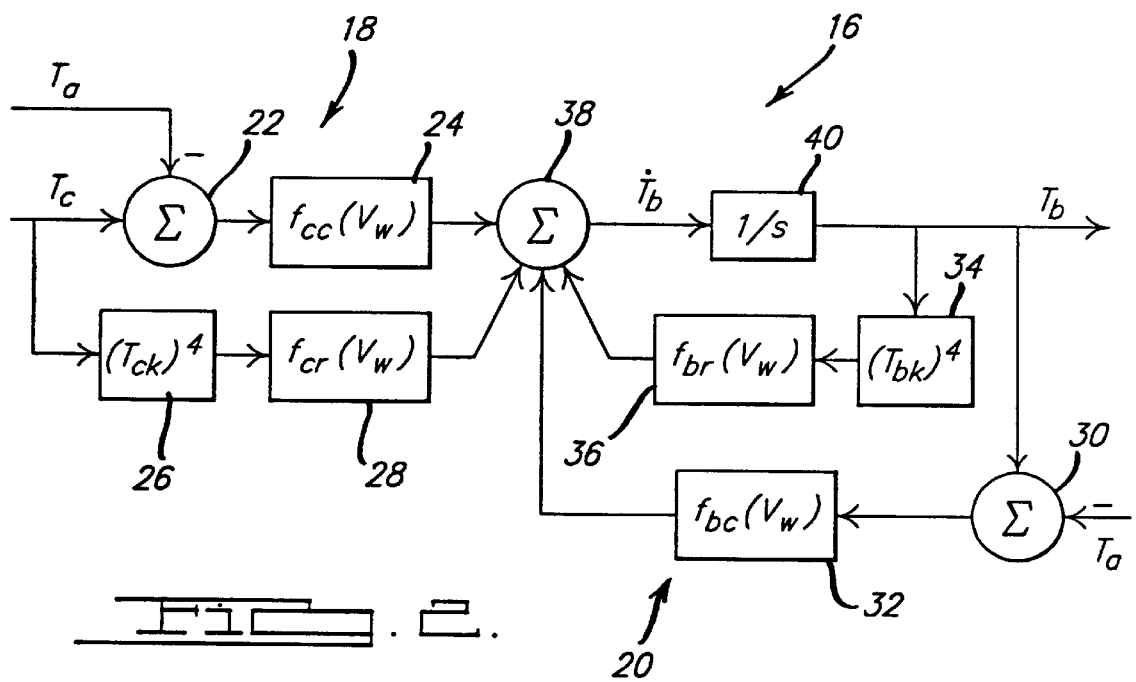
FIG. 2 is a non-linear dynamic system model for predicting an internal battery temperature, according to an embodiment of the present invention.

The battery temperature prediction model from the physical concepts gives a good qualitative understanding. However, it is usually difficult to determine the exact form of the coefficient functions and their parameters for a particular application from the existing heat transfer theory. Thus, system identification technology is used to quantitatively determine the form of the coefficient functions and their parameters. FIG. 2 shows a block diagram of a first order non-linear dynamic control system 16 based on equation (4) above. The control system 16 is separated into a feed forward portion 18 and a feed back portion 20.

In the feed forward portion 18, to determine the heat transfer contribution from the coefficient function of heat conduction and convection, the ambient temperature measurement $T_a$ is subtracted from the engine coolant temperature $T_c$ in a summer 22, and the difference is applied to a function block 24 that determines $f_{cc}$. To determine the heat transfer contribution from heat radiation from the engine block, the absolute engine coolant temperature $T_{ck}$ is multiplied to the fourth power in block 26, and the coefficient function $f_{cr}$ is determined in block 28.

In the feedback portion 20, to determine the heat transfer contribution from the heat conduction and convection of the battery, the ambient temperature $T_a$ is subtracted from the last determined battery temperature $T_b$ in a summer 30, and $f_{bc}$ is determined in block 32. To determine the contribution from the heat radiation from the battery itself, the absolute battery temperature $T_{bk}$ is multiplied to the fourth power in block 34, and $F_{br}$ is then determined in block 36. Each of the heat contribution functions $f_{cc}$, $f_{cr}$, $f_{br}$, and $f_{bc}$ are then added together in a summer 38. This gives the change in battery temperature with respect to time $dT_b/dt$, which is integrated by an integrator 40 to generate the current battery temperature $T_b$.

These heat contribution functions include several model parameters that need to be identified depending on the heat transfer properties of the vehicle and the battery. To identify the model parameters, it is first necessary to define a prediction error function in terms of the measured battery temperature $\hat{T}_b(t_i)$ and the predicted battery temperature $T_b(t_i, P)$ from the model:

$$\epsilon_i(P) = T_b(t_i, P) - \hat{T}_b(t_i) \quad (6)$$

where i=1, . . . , M, M is the number of data points and $P = (P_o, P_1, \ldots, P_N)$ is a parameter vector with N+1 elements. The model parameters in the vector P are then found by minimizing the total square error.

FIG. 3 shows a block diagram 46 depicting the process of determining a proper model structure and parameters for the dynamic model of the invention. To determine the battery temperature $T_b$ based on this model, it is first necessary to determine the physical concepts of the particular vehicle system, as represented by block 48. From the physical concepts, the model structure is identified as indicated by block 54. Further, it is necessary to collect the system data of the vehicle to determine the specific parameters, and thus the coefficient functions discussed above using a system identification method as represented by box 50. The model parameters determined for a particular vehicle is indicated by box 52. From the model structure and the model parameters, the battery temperature $T_b$ is estimated for any given instant in time as indicated by box 56.

In addition to defining the model's coefficient functions and parameters, initial values need to be identified to start the prediction process because of the large heat capacity of the vehicle battery. It may take quite a long time for the prediction process to converge to a normal state if an inaccurate initial value of the battery temperature is used to start the prediction process. The initial values are generated by modeling the cooling process of the engine coolant temperature $T_c$, the ambient air temperature $T_a$ and the battery temperature $T_b$. FIG. 4 shows a differential equation described for engine coolant temperature $T_c$, a differential equation for ambient air temperature $T_a$ with an input of the engine coolant temperature $T_c$, and a differential equation for battery temperature $T_b$ also with an input of the engine coolant temperature $T_c$ after the engine is off. These equations are solved to determine the initial value of the battery temperature by using the current measured engine coolant temperature $T_c$, the air temperature $T_a$ when the engine is turned on, the predicted battery temperature $T_b$ measured engine coolant temperature $T_c$, and the air temperature $T_a$ which were stored in the engine control module just before the engine was turned off.

The battery internal temperature prediction model including its initial value estimation is developed based on the physical concept of heat transfer in a system identification technique. The prediction results of the tests outperform the actual measurement from the existing vehicle battery thermistor sensor. The procedure for model parameter determination is systematic and efficient. The model computation requirement for the real time prediction is low and affordable for the current production engine controller.

The dynamic temperature model depicted in equation (4) and FIG. 2 is a general representation of determining the battery temperature $T_b$ in a continuous time system. The actual implementation of the battery temperature model has to be done in the digital domain. A discrete model based on equation (4) for determining $T_b$ in a practical application is given below. The battery temperature $T_b$ is updated every time increment in terms of the following equation:

$$T_b = e_0 T_b(n-1) + f_{cv}[T_b(n-1) - T_d(n-1)] + \\ f_{cd}[T_c(n-1) - T_d(n-1)] + f_{cr}T_{ck}^4(n-1) + f_{br}T_{bk}^4(n-1) \quad (7)$$

where $$f_{cv} = a_0 + a_1 V_s(n-1) + a_2 V_s^2(N-1) + a_3 V_n(n-1) + \\ a_4 V_n^2(n-1) + a_5 V_f(n-1)$$

$$f_{cd} = b_0 + b_1 V_s(n-1) + b_2 V_s^2(n-1) + b_3 V_n(n-1) + \\ b_4 V_n^2(n-1) + b_5 V_f(n-1)$$

$$f_{cr} = c_0 + c_1 V_s(n-1) + c_2 V_s^2(n-1) + c_3 V_n(n-1) + \\ C_4 V_n^2(n-1) + c_5 V_f(n-1)$$

$$f_{br} = d_0$$

$$V_n(n-1) = [\alpha_o - T_c(n-1)][1 - V_s(n-1)],$$
if $T_c(n-1) < \alpha_0$; otherwise, $V_n(n-1) = 0$ $$T_{ck}(n-1) = \beta_0 + \beta_1 T_c(n-1)$$

$$T_{bk}(n-1) = \beta_0 + \beta_1 T_b(n-1)$$

Here, n represents the current time step and n−1 represents the previous time step. The sampling time or the time interval between two executions is fixed. The current battery temperature $T_b(n)$ is calculated from the previous battery temperature $T_b(n-1)$, coolant temperature $T_c(n-1)$, air temperature $T_d(n-1)$, vehicle speed $V_s(n-1)$, and the radiator fan's on/off state $V_f(n-1)$.

$a_0, a_1, \ldots, a_5, b_0, b_1, \ldots, b_5, c_0, c_1, \ldots, C_5, d_0, e_0$ are the model coefficients, and $\alpha_0$, $\beta_0$ and $\beta_1$, are constants. These model coefficients are fixed for one type of vehicle after the model has been developed, but they may need to be recalibrated using a systematic off-line optimization procedure for different types of vehicles. All these coefficients are prescaled and saved in ROMs.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of determining the internal temperature of a battery, said method comprising the steps of:
   determining an air temperature around the battery;
   determining a function of heat convection that affects the temperature of the battery;
   determining a function of heat conduction that affects the temperature of the battery;
   determining a function of heat radiation that affects the temperature of the battery; and
   determining the temperature of the battery based on a heat contribution from each of the functions of heat convection, heat conduction, and heat radiation.

2. The method according to claim 1 wherein the step of determining a function of heat radiation includes the steps of determining a function of heat radiation from an engine block and a function of heat radiation from the battery.

3. The method according to claim 1 wherein each of the functions of heat convection, heat conduction, and heat radiation are determined at least in part based on a wind speed.

4. The method according to claim 3 wherein the wind speed is determined as a function of a vehicle speed, a natural wind speed, and an engine coolant fan on/off state.

5. The method according to claim 1 further comprising the step of determining a temperature of an engine coolant.

6. The method according to claim 1 wherein the functions of heat convection and heat conduction are determined at least in part by an engine coolant temperature and the air temperature around the battery.

7. The method according to claim 1 further comprising the steps of determining physical concepts of heat convection, heat conduction and heat radiation, and determining a particular system structure and model parameters.

8. The method according to claim 1 further comprising the steps of determining initial values for the battery temperature, engine coolant temperature, and the surrounding air temperature.

9. The method according to claim 8 wherein the step of determining an initial value for the battery temperature includes determining the initial value based on the measurements of air temperature and coolant temperature when the engine is turned on and temperature information stored in an engine control module just before the engine was turned off.

10. The method according to claim 1 wherein the step of determining the temperature of the battery includes solving a dynamic battery temperature model.

11. The method according to claim 10 wherein the step of solving the dynamic model includes numerically solving the equation:

$$\frac{dT_b}{dt} = f_{bc}(V_w)(T_b - T_a) + f_{cc}(V_w)(T_c - T_a) + f_{cr}(V_w)T_{ck}^4 + f_{br}(V_w)T_{bk}^4$$

where $T_b$, represents the temperature of the battery, $T_c$ represents the temperature of an engine coolant, $T_B$ represents the temperature of the surrounding air, $T_{ck}$ is the absolute temperature of $T_c$, $T_{bk}$ is the absolute temperature of $T_b$, $f_{bc}(V_w)$ and $f_{cc}(V_w)$ represent the functions of heat convection and heat conduction, $f_{cr}(V_w)$ represents a function of heat radiation from the engine block, $f_{br}(V_w)$ represents a function of the heat radiation from the battery itself, and $V_w$ is a wind speed.

12. The method according to claim 11 wherein the wind speed $V_w$ is expressed as a function of vehicle speed $V_s$, natural wind speed $V_n$ and an engine coolant fan on/off state $V_f$.

13. The method according to claim 12 wherein the natural wind speed $V_n$ is determined by the coolant temperature $T_c$ and the vehicle speed $V_s$.

14. A method of determining the internal temperature of a vehicle battery associated with an internal combustion engine of a vehicle, said method including solving a dynamic battery temperature model, said method comprising the steps of:
    determining an air temperature around the battery;
    determining a temperature of an engine coolant fluid;
    determining a wind speed variable;
    determining a first term of the battery temperature model, said step of determining the first term including determining the first term based on the wind speed variable, a previous battery temperature, and the air temperature around the battery;
    determining a second term of the battery temperature model, said step of determining the second term including determining the second term based on the wind speed variable, the coolant fluid temperature, and the air temperature around the battery;
    determining a third term of the battery temperature model, said step of determining the third term including determining the third term based on the wind speed variable and the engine coolant temperature; and
    determining a fourth term of the battery temperature model, said step of determining the fourth term including determining the fourth term based on the wind speed variable and the previous battery temperature.

15. The method according to claim 14 further comprising the steps of adding the first, second, third and fourth terms to determine the current battery temperature.

16. The method according to claim 14 wherein the step of determining the wind speed variable includes determining the wind speed variable as a function of a vehicle speed, natural wind speed, and an engine coolant fan on/off state.

17. The method according to claim 14 further comprising the steps of determining physical concepts of heat convection, heat conduction and heat radiation, and determining particular vehicle system data and model parameters.

18. The method according to claim 14 further comprising the steps of determining an initial value for the battery temperature based on the coolant fluid temperature, the air temperature around the battery when the engine is turned on, and battery temperature information that was stored in engine control module just before the engine was turned off.

19. A method of determining the internal temperature of a battery by developing a non-linear battery temperature dynamic model, said method comprising the steps of:
    determining physical concepts of thermal transfer, said step of determining physical concepts including determining an engine coolant temperature, a surrounding air temperature, a vehicle speed, and an engine fan on/off state;
    determining model parameters of a system incorporating the battery using a system identification technique; and
    determining a battery temperature estimation using the engine coolant temperature, the surrounding air temperature, the vehicle speed and the engine fan on/off state.

20. The method according to claim 19 further comprising the step of determining a wind speed, said wind speed being determined as a function of the vehicle speed, a natural wind speed, and the engine coolant fan on/off state.

21. The method according to claim 19 further comprising the steps of determining an initial value of the internal battery temperature from a measured cooling fluid temperature and the surrounding air temperature.

22. A system for determining the internal temperature of a battery, said system comprising:
    a temperature sensor for providing a temperature measurement of the air around the battery;
    a heat convection system for determining a function of heat convection that affects the temperature of the battery;
    a heat conduction system for determining a function of heat conduction that affects the temperature of the battery;
    a heat radiation system for determining a function of heat radiation that affects the temperature of the battery; and
    a processor for determining the temperature of the battery based on a heat contribution from each of the functions of heat convection, heat conduction and heat radiation.

23. The system according to claim 22 wherein the system for determining a function of heat radiation determines the function of heat radiation from an engine block and from the battery.

24. The system according to claim 22 wherein each of the systems determining heat convection, heat conduction and heat radiation determine the heat convection, heat conduction and heat radiation based at least in part on a wind speed.

25. The system according to claim 24 wherein the processor determines the wind speed as a function of a vehicle speed, a natural wind speed and an engine coolant fan on/off state.

26. The system according to claim 22 further comprising a temperature sensor for determining an engine coolant temperature.

27. The system according to claim 26 wherein the heat convection system and the heat conduction system determine the functions of heat convection and heat conduction based in part on the engine coolant temperature and the air temperature around the battery.

* * * * *